(12) United States Patent
Leidén et al.

(10) Patent No.: US 8,474,401 B2
(45) Date of Patent: Jul. 2, 2013

(54) METHOD AND APPARATUS FOR COATING PIPES

(75) Inventors: Leif Leidén, Andersböle (FI); Sven Sjöberg, Vasa (FI); Rauno Smått, Toijala (FI)

(73) Assignees: Oy KWH Pipe AB, Vaasa (FI); Borealis Technology Oy, Porvoo (FI)

( * ) Notice: Subject to any disclaimer, the term of this patent is extended or adjusted under 35 U.S.C. 154(b) by 729 days.

(21) Appl. No.: 12/597,434

(22) PCT Filed: Apr. 24, 2008

(86) PCT No.: PCT/FI2008/050223
§ 371 (c)(1),
(2), (4) Date: Oct. 23, 2009

(87) PCT Pub. No.: WO2008/132279
PCT Pub. Date: Nov. 6, 2008

(65) Prior Publication Data
US 2010/0133324 A1     Jun. 3, 2010

(30) Foreign Application Priority Data
Apr. 25, 2007   (EP) ..................................... 07397011

(51) Int. Cl.
*B05C 5/02*   (2006.01)
(52) U.S. Cl.
USPC ..... 118/407; 118/410; 118/429; 118/DIG. 11
(58) Field of Classification Search
USPC .......... 118/407, 410, 429, DIG. 11; 425/190, 425/375, 113; 228/44.5, 49.3
See application file for complete search history.

(56) References Cited

U.S. PATENT DOCUMENTS

| | | | |
|---|---|---|---|
| 3,236,917 A | 2/1966 | Natta et al. | |
| 4,211,595 A | 7/1980 | Samour | |
| 4,639,495 A | 1/1987 | Waggoner | |
| 4,950,541 A | 8/1990 | Tabor et al. | |
| 5,194,509 A | 3/1993 | Hasenbein et al. | |
| 2007/0277733 A1* | 12/2007 | Wood et al. | 118/258 |
| 2010/0224306 A1* | 9/2010 | Sutton et al. | 156/64 |

FOREIGN PATENT DOCUMENTS

| | | |
|---|---|---|
| EP | 1 016 514 A2 | 7/2000 |
| EP | 1 859 926 A1 | 11/2007 |
| JP | 56-95656 A | 8/1981 |
| WO | WO-93/17857 A1 | 9/1993 |
| WO | WO-01/32316 A1 | 5/2001 |
| WO | WO-2007/143559 A1 | 12/2007 |
| WO | WO-2007/143565 A1 | 12/2007 |
| WO | WO-2008/071773 A2 | 6/2008 |
| WO | WO 2008071773 A2 * | 6/2008 |

* cited by examiner

*Primary Examiner* — Laura Edwards
(74) *Attorney, Agent, or Firm* — Birch, Stewart, Kolasch & Birch, LLP

(57) ABSTRACT

Method and apparatus for coating a pipe or a pipe section with a layer of at least one polymer. The method includes providing the pipe or the pipe section having an outer surface defining the periphery of the pipe or the pipe section; applying on the outer surface of the pipe or pipe section a layer of at least one polymer material in melt stage using a nozzle, which is mounted on a carriage capable of travelling along the periphery of the pipe or the pipe section; and moving the carriage along at least a part of the periphery during the application of the polymer material to form a layer on the surface of the pipe or the pipe section that is particularly useful for coating field joints in pipelines.

8 Claims, 3 Drawing Sheets

METHOD AND APPARATUS FOR COATING PIPES

The present invention concerns a method for coating a pipe or a pipe section.

According to a method of this kind, a layer of at least one polymer material is applied on the surface of the pipe or pipe section at least along a part of the periphery thereof.

The present invention also comprises an apparatus for applying a polymer coating on the surface of a pipe.

Steel pipes coated with layers of polymers, such as polyethylene or polypropylene, have been used in oil and gas pipelines for a long time. These kinds of pipes are mechanically strong and have good corrosion resistance along the coated part of the pipe. They are generally welded together using the SAW technique (Submerged Arc Welding) to form a pipeline. To facilitate weld-joining of the pipes at the construction site, a length of the pipe is usually left uncoated at both ends at the factory where the polymer coating is otherwise applied on the surface of the pipe.

Field-welded joints, i.e. the joints formed at the construction sites, are sensitive to corrosion. For this reason, a coating layer has to be spread upon the girth weld and on the adjacent, uncoated portions of the pipes so as to completely cover the welded joint and to shield it from moisture and water in the ambience.

A number of ways of producing protective coatings of field-welded joints are known in the art. Conventionally, the welded joints are covered in a film of polyethylene film (shrink-sleeve), which can be shrink-wrapped around the joint to cover the weld. This method accounts for about 65% of the field-joint coatings in case of polyethylene-coated steel pipes. Another option is to provide the girth weld with a cover of urethane or epoxy resins. Such coatings can be sprayed on the pipe using spray guns. Further alternatives are represented by machine taping, surface molten tape, manual taping and injection moulding. Some of these techniques give rise to good coating results but are difficult, if not impossible, to use in field conditions; some fail to give adequate protection against corrosion.

It is an aim of the present invention to eliminate at least a part of the problems related to the prior art and to provide a novel method of coating pipes.

It is another aim of the present invention to provide a novel kind of apparatus for coating pipes.

The present invention is based on the idea of applying at least one polymer material in the form of a melt film or sheet on the surface of the pipe or pipe section from a moving die or nozzle. In particular, the melt polymer film or sheet is applied on the pipe from a die which is mounted on a carriage, which can be moved along the periphery of the pipe or pipe section.

An apparatus according to the invention comprises
a movable carriage, which is capable of travelling around the periphery of the pipe or pipe section; and
a flat die connected to a source of a polymer melt and mounted on the moveable carriage for applying a polymer layer in melt form on the surface of a pipe or pipe section.

Further, the apparatus comprises, in combination with the above features, a leveling means for leveling the melt polymer layer formed on the surface of the pipe or pipe section.

Considerable advantages are obtained by means of the invention. Thus, the method and apparatus according to the invention can be used for coating field joints of pipelines, but it can also be used for other coating applications, where a layer of polymer material needs to be applied upon the surface of a pipe or a similar substrate. Therefore, the invention can also be used for repairing various polymer coatings. The apparatus is light-weight, operator friendly and easy to use in field conditions. The equipment described below can be moved and operated with a tractor with trailer and a log-lift—all equipment being placed on the trailer. The log-lift can be used for moving a tent for shielding off the coating area and the die and platform from one joint to next. Cooling is mostly not needed, but can be effected with e.g. blowing of air or with a wet cloth. The coated area can be readily repaired, if needed with a portable welding machine.

Importantly, when used for producing a field-joint coating, the result of the present method and apparatus will be as good as a factory coating and the invention is fully operational in field conditions, all weather conditions taken into account. The invention can be used for coating sections of pipes or whole pipes. It can also be used for coating the area surrounding a welded or otherwise accomplished joint between two pipes, as will be discussed below.

Next the invention will be examined more closely with the aid of a detailed description and with reference to the attached drawings.

Figure 1:
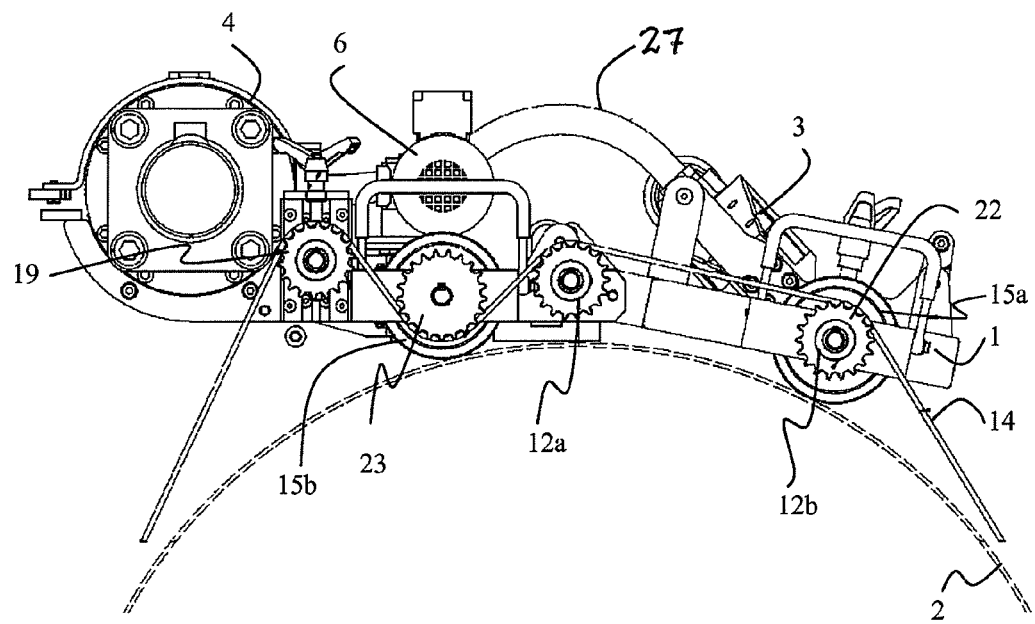
FIG. 1 shows in side view the structure of a coating device according to one embodiment of the invention, wherein the movable die is arranged on a carriage which is provided with an intermediate container for melt polymer.

The method according to the present invention for coating a pipe or a section of a pipe with a polymer layer generally comprises, in combination, the steps of:
providing a pipe or a pipe section having an outer surface defining the periphery of the pipe or pipe section;
applying on the outer surface of the pipe or pipe section a layer of at least one polymer material in the melt state with a nozzle or die, which is mounted on a carriage capable of travelling along the periphery of the pipe or pipe section; and
moving the carriage along at least a part of the periphery for applying the material onto at least a part of the pipe or pipe section.

According to an embodiment, the method according to the present invention is used for producing a polymer layer having a predetermined breadth, whereby the material is applied on the surface of the pipe or pipe section using a flat die having a width of the slit gap essentially corresponding to the predetermined breadth of the layer.

In practice, the melt polymer film applied on the surface of the pipe or pipe section, is leveled after application. By leveling the polymer material, it is possible to some extent to adjust the thickness of the layer so that it corresponds to a pre-selected thickness of the coating. Importantly, however, by leveling any air pockets between the polymer layer and the coated surface can be removed and a tight and hermetic coating is achieved.

Leveling can be carried out manually or using a separate tool. However, according to a particularly preferred embodiment, the movable carriage is provided with a leveling means, as will be explained below in more detail.

According to a preferred embodiment, the carriage is moved along the periphery of the pipe or pipe section a distance essentially corresponding to a pre-selected length of the polymer coating. It is preferred to have the carriage travel at least 180 degrees and in particular at least 360 degrees along the periphery of the pipe or pipe section to provide a polymer layer covering half or all the outer surface along the periphery. One embodiment allows for several consecutive wrapping layers, e.g. by moving the carriage along a spiral-shaped path along the periphery of the pipe or pipe section to provide a polymer layer. In such a case, it is particularly advantageous to have each following layer partially overlap the proceeding layer whereby a hermetic and tight sealing layer can be produced. For achieving a spiral-shape path, the pipe can be axially transferred during coating.

The polymer film can have any desired dimensions, but typically it has a thickness in the range of 0.01 to 10 mm, preferably about 0.1 to 7 mm, in particular about 0.5 to 5 mm. The breadth of the film is about 1 to 1500 mm, preferably about 5 to 1250 mm, in particular about 10 to 1000 mm. The length is advantageously about ¼ of the periphery to about 20 times the periphery, although this is no limit. In general, for example for covering a field joint/weld about 1 to 10 succeeding layers of partly overlapping polymer films suffices.

The coating may comprise a film of only one polymer material, but it can also be formed of a multilayer structure, where there are films of two or more polymer materials.

At least one of the films can be a foamed polymer. Typically, the surface or skin layer of the coating is composed of a solid polymer layer.

As already indicated above, the polymer material is applied in the form of a melt film. The film is preferably produced with an "extrusion nozzle" or "extrusion die" which is capable of forming a melt polymer material into a polymer film having a breadth essentially corresponding to the preselected breadth of the coating layer. Any die, such as a flat die, capable of producing a melt film or sheet of the polymer material used, can be applied and is included in the definition of "extrusion die" and "extrusion nozzle". I.e. said term is to be construed to stand for any die or nozzle capable of forming a film from the feed of a polymer melt. Naturally, multilayer film dies or nozzles can also be used.

As known in the art, the cross-section of the flow channel at the entrance of a flat die is typically a circle or a rectangle with a small aspect ratio. In the die, this initial cross-section is gradually transformed to a large aspect ratio rectangle required for sheet extrusion. The channel geometry in a flat die is designed so as to provide for uniform velocity at the exit of the die.

The die is connected to at least one source of melt polymer material. This source is typically selected from the group of extruders, heated screw mixers and storage containers. For producing multilayered film, it is possible to connect the die to two or more sources of polymer material.

One typical source of melt polymer is a conventional extruder, where the starting material comprising polymer pellets is heated before feeding with a feed screw to the extrusion tool. It is possible to connect the die to the extruder to provide for direct feed of melt polymer to the die. The extruder can be replaced with a heated screw mixer which can be filled with polymer pellets and where the polymer can be molten. Such a screw mixer can be mounted on the carriage.

In lieu of direct feed, the heated polymer melt can be intermediately stored on the carriage. This intermediate storage can be formed by, for example, a cylinder which is filled with the melt polymer mass and from which it can be pressed out through the die onto the pipe. The cylinder is heated and/or well-insulated, and it can be mounted on the same frame as the die. The cylinder can be heated with electrical resistance heaters placed about the cylinder. For emptying the intermediate storage container it is preferably provided with a piston, which is hydraulically or pneumatically operated, i.e. generally with any pressure means, or it is electrically operated. Instead of a piston, a conveyor screw can be used. According to one preferred embodiment, the intermediate storage container is replaceable as a cartridge, which makes facilitates a change of polymer during operation.

The thickness of the polymer coating can be controlled by adjusting the thickness of the polymer film extruded from the die. The lip distance (thickness of gap) is generally 0.1 to 50 mm, preferably about 1 to 10 mm, in particular about 1.5 to 5 mm. Alternatively, by using a carriage capable of travelling at an adjustable velocity it is also possible to control the thickness of the film extruded from the nozzle by the velocity of the carriage. In that case, the polymer material typically is extruded from a flat die at an essentially constant extrusion rate. Naturally, a combination of the two alternatives can be used.

The velocity of the carriage can be freely regulated. Depending on the thickness of the film and the consumption of the polymer material it is typically in the range of about 0.01 to 20 m/min, for example about 0.1 to 5 m/min, in particular about 0.3 to 2 m/min.

The thickness of the polymer layer—and the adherence of the layer to the pipe or pipe section—is also influenced by the leveling means used for smoothening and flattening out the polymer layer deposited on the surface. The leveling means typically applies a force generally perpendicular to the polymer material. This leveling means can be, for example, a roller or a blade.

In one embodiment, the roller has a central axis and an elastic surface. The surface is adjustable in the direction of the central axis to fit the surface profile of the pipe or pipe section at the part which is to be coated. For that purpose the roller may comprise an integral roller/cylinder or it can be formed by several cylindrical sections of the same or even somewhat different diameters. The elastic surface can be achieved by using silicon or rubbery materials. Generally, the hardness of the elastic surface is about Shore A 10 to 30.

A leveling means in the form of a blade can also be stiff or elastic, preferably elastic.

Generally it is preferred that the surface of the leveling means is capable of following the upper surface of the pipe or pipe section in such a way that it smoothens the polymer layer against the surface tightly. The surface of the leveling means is also adapted to the adhesive properties of the melt polymer to provide for easy release.

According to one particularly preferred embodiment already mentioned above, the leveling means is mounted on the same movable carriage as the extrusion nozzle/flat die. One way of carrying out this embodiment comprises extruding from the flat die a film onto the leveling means and transferring from the leveling means onto the outer surface of the pipe or pipe section. In this case, the leveling means operates as an applicator and it smoothens and levels the film while transferring it against the surface of the pipe or pipe section.

It is, however, possible to spread the polymer film onto the outer surface of the pipe also directly from the flat die, e.g. by non-contact coating (curtain coating), whereby a flat leveling means is used for smoothening the polymer layer deposited on the surface.

In a preferred embodiment, the polymer material is applied on a surface comprising at least partially an uncoated part of a polymer coated steel pipe. The pipe section may comprise the girth weld between two adjacent pipes, which are welded to each other. The girth weld and the adjacent parts of the uncoated steel pipe, including the abutting ends of the polymer coating, are coated for tightly sealing off the girth weld against air, moisture and water.

Other applications of the present method include repair of polymer coatings, coating of generally any polymer pipes and also of materials different from polymers are metals.

According to a preferred embodiment, the movable carriage can be guided for movement around the periphery of the pipe or pipe section with strapping and guiding means. Such means are exemplified below by chains for traction drive, but various belts and wires can also be used. The carriage can, naturally, be pressed against and moved along the periphery also manually.

In all above applications, the pipe or pipe section is coated with at least one thermoplastic polymer, for example one selected from the group consisting of polyolefins, in particular polyethylene and polypropylene, and modified polyolefins. One class of particularly interesting polymers is formed by stand alone polyolefins, disclosed in more detail in our co-pending patent application EP 06010822, titled "Structure comprising Polyolefin Layer or Profile with Enhanced Adhesion", filed May 26, 2006, the contents of which are herewith incorporated by reference. Such polyolefins comprise adhesion promoting groups, in particular polar groups, e.g. groups selected from the group of acrylates, such as methylacrylates, methylmethacrylates, propylacrylates, butylacrylates, carboxylic acids, such as maleic acid, and amines.

Polyolefins with adhesion promoting, preferably polar, groups may e.g. be prepared by copolymerisation of olefin monomers with comonomer compounds bearing such groups or by grafting of appropriate compounds onto the polyolefin backbone after the polyolefin has been produced. If copolymerisation is used for the production of the polyolefin with adhesion promoting groups, it is preferred that a polar copolymer is produced which comprises a copolymer of ethylene with one or more comonomers selected from C1- to C6-alkyl acrylates, C1- to C6-alkyl methacrylates, hydroxy functional monomers, anhydride functional monomers, e.g. 2-hydroxy-ethyl (meth-)acrylate, acrylic acids, methacrylic acids, vinyl acetate and vinyl silanes. For example, the polar copolymer may also be a terpolymer of ethylene, one of the above mentioned monomers and a vinyl silane. The copolymer may also contain ionomeric structures (like in e.g. DuPont's Surlyn types).

If grafting is used to obtain the polyolefin with adhesion promoting groups, as grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic or non-metallic). Preferably, the unsaturated group is in conjugation with the carboxylic group. Examples of such grafting agents include vinyl silanes, acrylic acid, methacrylic acid, fumaric acid, maleic acid, nadic acid, citraconic acid, itaconic acid, crotonic acid, and their anhydrides, metal salts, 5 esters amides or imides.

The preferred grafting agents are maleic acid, its derivatives such as maleic acid anhydride, and in particular maleic acid anhydride.

Grafting can be carried out by any process known in the art such as grafting in an melt without a solvent or in solution or dispersion or in a fluidised bed. Preferably, grafting is performed in a heated extruder or mixer as e.g. described in U.S. Pat. No. 3,236,917, U.S. Pat. No. 4,639,495, U.S. Pat. No. 4,950,541 or U.S. Pat. No. 5,194,095. The contents of these documents is herein included by reference. Preferably, grafting is carried out in a twin screw extruder such as described in U.S. Pat. No. 4,950,541.

Grafting may be carried out in the presence or absence of a radical initiator but is preferably carried out in the presence of a radical initiator such as an organic peroxide, organic perester or organic hydroperoxide.

As mentioned, preferably, the polar groups in the polyolefin are selected from acrylates, e.g. methylacrylates, methylmethacrylates, propylacrylates, butylacrylates, carboxylic acids such as maleic acid and amines.

The base resin is composed of either one type of polyolefin or a mixture of two or more types of polyolefins. Preferably, the polyolefin of the base resin is composed of an ethylene homo- or copolymer and/or a propylene homo- or copolymer or a mixture thereof. The concentration of adhesion promoting groups in the polyolefin is typically from 0.01 to 5.0 mol-%, preferably about 0.02 to 1.0 mol-%, calculated from the total amount of olefin monomers in the polyolefin composition.

The methods as discussed above, are preferably carried out by first heating the outer surface of the pipe or pipe section. By heating the surface, better adherence of the film to the outer surface can be reached. The temperature is selected depending on the properties of the polymer and on the heating time. Generally, it is not necessary to heat up the surface to the melting temperature of the polymer. Preferably the pipe surface is heated at a temperature in the range of 80 to 300° C. before coating. The heating can be carried out manually. One preferred embodiment comprises heating the surface with a heating means mounted on the carriage. This heating means is preferably mounted before the leveling means and the die in the progression direction of the carriage.

Before the surface is coated, it is possible to modify the surface of the pipe or pipe section by contacting it with a priming agent for improving adherence between the polymer layer and the surface. Naturally, the surface is preferably cleaned before any other treatment. Cleaning can be carried out for instance by shot or grit blasting or by sand blasting.

Figure 2:
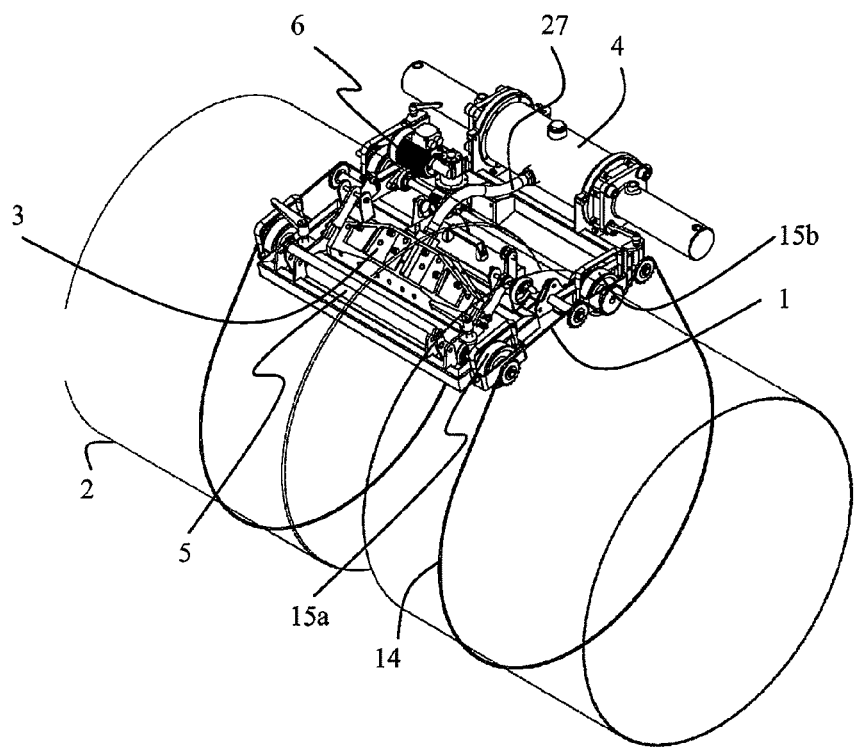
FIG. 2 shows the same embodiment in perspective view.

Next, some embodiments of the present invention will be examined more closely with the aid of the attached drawings for illustrating the use of the invention for coating of field-welded joints. In FIGS. 1 and 2 illustrate frame 1, pipe 2, nozzle assembly 3, feed cylinder 4, levelling roller 5, motor 6, retaining rings for shaft 12a, 12b, chain 14 wheels 15a, 15b, chain tightener 19, chain wheels 22, 23, and pressure hose 27.

As shown in FIGS. 1 and 2, the present moveable coating device comprises a frame 1 supported upon two sets of wheels 15 for traveling along the surface of a pipe 2. The carriage 1, 15a, 15b is strapped onto the pipe 2 with the aid of at least one chain 14—in the embodiment according to the drawing, there are two chains—arranged in a loop around the pipe and having a length greater than circumstance of the pipe 2. The traction chain 14 engages chain wheels 22, 23 on the frame, at least some of which are rigidly mounted on the same axis (shaft) as the wheels 15 and kept in place with retaining rings 12a, 12b. A chain tightener 19 is provided for keeping the tension of the chain suitable for keeping the carriage 1, 15a, 15b pressed against the surface.

Figure 3A:
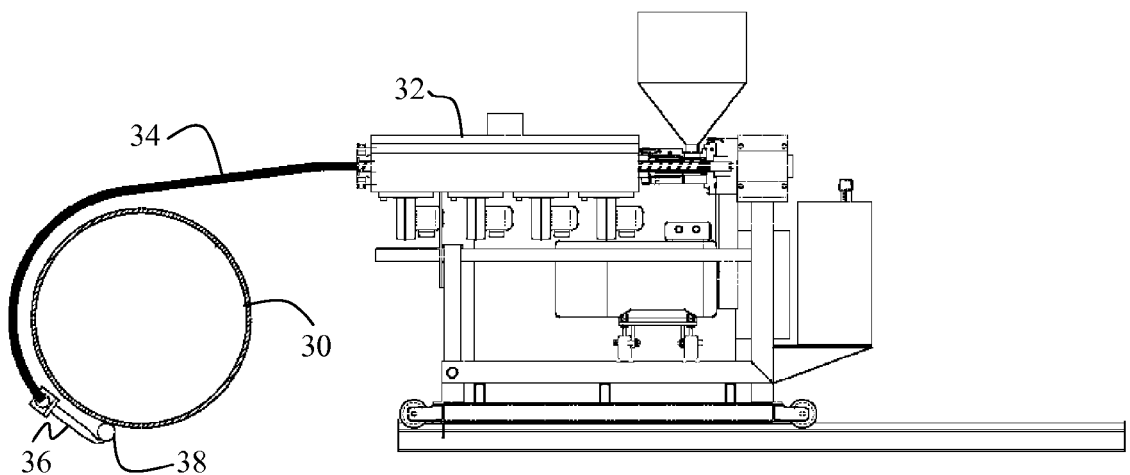
FIGS. 3a to 3c show the process of extruding a polymer film on the surface with the aid of one embodiment of the present invention, wherein melt polymer film is extruded on the surface of a pipe using a movable die directly connected to an extruder.
Figure 3B:
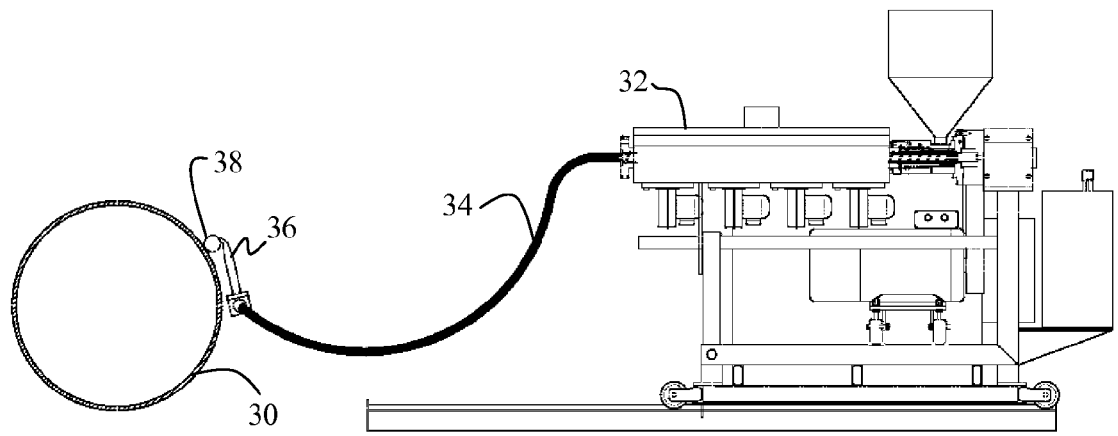
Figure 3C:
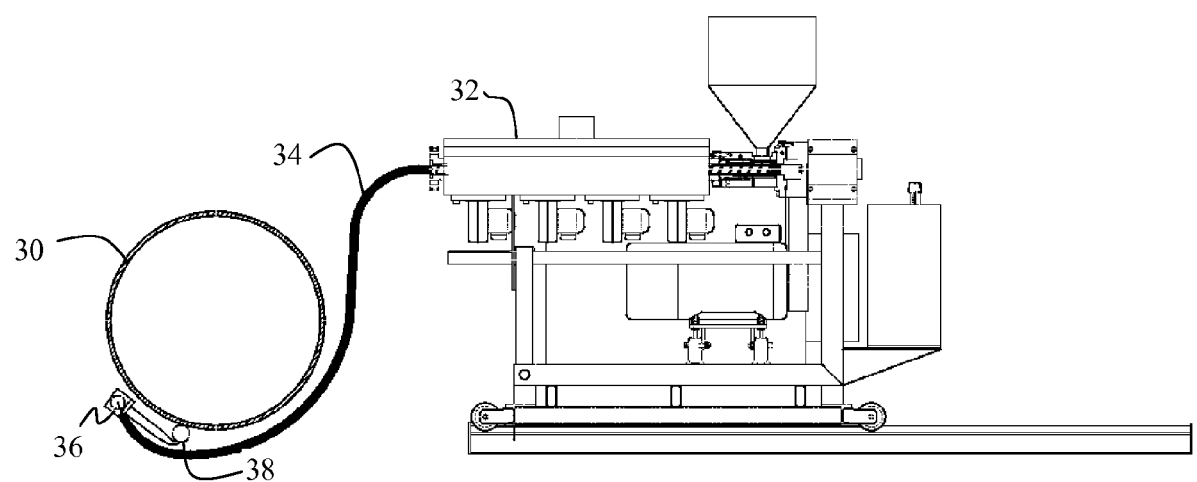

In the moving direction, the carriage 1, 15a, 15b comprises a heating means (not shown) in the form of a radiation heater, such as an IR radiator. Next to the heating means there is a flat die 3, which is fed by polymer melt from a cylinder 4, which can be filled with the calculated amount of polymer melt needed for covering a predetermined surface of a pipe. The cylinder 4 and the die 3 are connected with a pressure hose 27. The cylinder is provided with an emptying means, e.g. a piston, which pushes melt polymer out of the cylinder 4 and through the hose 27 to the die 3. As mentioned above, it is also possible to feed melt polymer directly from an extruder into the die, as illustrated in FIGS. 3a to 3c.

Close to the front wheels 15a, there is an applicator/leveling roll 5, which transfers a polymer film extruded from the die 3 onto the surface of the pipe 2. The roll 5 is stressed with a spring (not shown) so that it presses against the surface of the pipe.

The carriage is driven by an electric motor 6 which is connected to the driving wheels 15a, 15b. Normally, the die travels one lap around the pipe, however, in special cases several laps can be done, depending on desired layer thickness or material combination. During this operation the fieldjoint will be extruded with molten polymers.

In FIGS. 1 and 2, the die is fed from an intermediate container mounted on the movable carriage. In one embodiment, a coated steel pipe was coated with a 3 mm thick polyolefin film having a breadth of 500 mm at a velocity of 0.7 m/min with a total polymer consumption of 60 kg/h.

FIGS. 3a to 3c show the operation of a moving die 36 which is fed directly from an extruder 32 via pressure hose 34, pipe 30 coated by applicator roll 38. The figures show how the pipe is coated by the carriage travelling around the pipe.

The coating method according to the invention can be carried out in the following way:

First, the surface of the pipe or pipe section—e.g. a field joint between two polyolefin coated steel pipes—is cleaned. This can be made with abrasive tools, e.g. shot or grit blasting or by sand blasting.

After the cleaning step, the surface is pre-heated. It is possible to utilize the heat from the pipes weld-together operation (pre- and post-heating of weld-zone). However, as indicated above, the carriage may also be provided with separate heating means, such as IR heating elements, or there can be separate for example manually operated IR heating means.

In stationary coating applications, typically in factories and barges, inductive heating can be used. Also gas flame heating is possible. Preferably the heating is carried out such that only the surface of the pipe is heated up.

The cleaned and heated surface is then treated with suitable materials. The materials are chosen for a project depends on the specification; it is possible to passivate the steel surface, for example with a chromate or sulphate treatment. Various primers can alternatively or additionally be spread on the surface. They can be selected from compositions comprising
  liquid epoxy one component;
  liquid epoxy two components (base+hardener);
  powder epoxy spray;
  organosilicon materials alone; and
  organosilicon materials+passivation.

After a pre-treatment/priming step, the adhesives and topcoats (e.g. the polymer coating layer) are applied.

Typical polymer coatings are based on polyolefins or other thermoplastic polymers. Exemplifying embodiments comprise polyethylene, polypropylene, adhesives in powder form or molten, SAPO (stand alone polyolefins, i.e. materials which can be used without separate adhesives). Also multilayer coatings are possible, where two or more layers are deposited on the surface simultaneously or consecutively.

In field, the operators (coaters) typically need the following equipment:
  a small extruder, preferably as simple and light as possible, for producing a melt polymer;
  preferably two cylinders for molten polymers (one in use, the other for filling);
  a blasting unit for cleaning of the field joint section;
  preheating equipment, radiators (IR), inductive or gas flame;
  an air compressor for blasting or pneumatic piston movement;
  the above-described coating device, which is strapped to the pipe with preferably two chains or equivalent strapping means; an electrical power source for pipe heating and overlap area are preferably mounted to the die;
  a generator for electricity; and
  hydraulic system for the cylinder piston operation.

In operation, the FJ application area can be placed inside a tent.

As discussed above, the present invention can be used for coating different pipes. The pipe diameters can vary generally in the range from about 200 mm to 3500 mm. Typically in the particularly preferred embodiment, where the invention is used for coating field joints between polyolefin coated pipes, the diameters of the pipes are in the range of about 250 to 1500 mm.

It should still be pointed out that according to one embodiment, the relative motion between the carriage and the pipe can also be achieved by rotating the pipe which maintaining the carriage in stationary position. Such an embodiment can be applied for example indoors, in factories.

The invention claimed is:

1. An apparatus for coating of a pipe or pipe section having an outer surface defining a periphery of the pipe or the pipe section, comprising:
  a movable carriage, which is capable of travelling around the periphery of the pipe or the pipe section;
  an extrusion die connected to a source of a melt polymer material for forming a polymer film, said die being mounted on the movable carriage, the source of the melt polymer material being selected from the group consisting of an extruder, a heated screw mixer, and an intermediate storage container;
  a hydraulically, pneumatically or electrically operated purging device for emptying the melt polymer material from the source; and
  leveling roller capable of leveling and smoothening the polymer film against the outer surface of the pipe or the pipe section.

2. The apparatus according to claim 1, wherein the carriage is capable of travelling at least 360 degrees along the periphery of the pipe or the pipe section for providing a polymer layer covering the outer surface along the periphery of the pipe or the pipe section.

3. The apparatus according to claim 1, wherein the leveling roller is mounted on the carriage.

4. The apparatus according to claim 1, wherein the leveling roller is selected from the group consisting of a plurality of rollers and a plurality of blades, adapted to apply a force generally perpendicular to the melt polymer material for smoothening the polymer film against the outer surface of the pipe or the pipe section.

5. The apparatus according to claim 4, wherein a surface of each of the leveling rollers has an elastic surface exhibiting a Shore A hardness of about 10 to 30.

6. The apparatus according to claim 1, wherein the die is adapted to form the polymer film onto the leveling roller means, and the leveling roller is capable of transferring the polymer film onto the outer surface of the pipe or the pipe section.

7. The apparatus according to claim 1, wherein the carriage comprises a heating device, placed in front of the leveling roller in a propagation direction of the carriage.

8. The apparatus according to claim 1, wherein the carriage is adapted to be strapped onto the pipe or the pipe section with at least one traction chain, which can be fitted about the pipe or the pipe section.

* * * * *